United States Patent
Hsu et al.

(10) Patent No.: US 6,754,147 B2
(45) Date of Patent: Jun. 22, 2004

(54) PHASE LOCKED LOOP FOR CONTROLLING RECORDABLE OPTICAL DISK DRIVE

(75) Inventors: Tse-Hsiang Hsu, Hsin-Chu (TW); Hung-Ching Chen, Kao-Hsiung Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 45 days.

(21) Appl. No.: 10/065,769

(22) Filed: Nov. 18, 2002

(65) Prior Publication Data

US 2004/0095861 A1 May 20, 2004

(51) Int. Cl.[7] .............................................. G11B 5/09
(52) U.S. Cl. ................... 369/47.28; 369/53.31
(58) Field of Search ........................ 369/47.28, 47.32, 369/53.12, 53.31, 53.34, 53.44, 59.12, 59.2, 124.14

(56) References Cited

U.S. PATENT DOCUMENTS

| | | | |
|---|---|---|---|
| 6,236,629 B1 * | 5/2001 | Hisakado et al. | 369/47.32 |
| 6,269,059 B1 | 7/2001 | Kuroda et al. | |
| 6,333,902 B1 * | 12/2001 | Shim | 369/47.54 |
| 6,445,656 B1 * | 9/2002 | Koide | 369/47.28 |

* cited by examiner

*Primary Examiner*—Paul W. Huber
(74) *Attorney, Agent, or Firm*—Winston Hsu

(57) ABSTRACT

A phase locked loop (PLL) for generating an oscillation signal such that the oscillation signal maintains a substantially constant phase difference with respect to a phase of a reference signal. The PLL includes a first frequency divider for dividing a frequency of the oscillation signal by a first divisor, and for generating a number of multiphase signals, such that each multiphase signal is out of phase with each of the other multiphase signals, a phase shift detection circuit for comparing a phase of the oscillation signal with the phase of the reference signal, and a phase adjusting circuit for selecting one of the multiphase signals generated by the first frequency divider to be an output signal such that the PLL is able to reduce the phase difference between the oscillation signal and the reference signal.

10 Claims, 10 Drawing Sheets

PHASE LOCKED LOOP FOR CONTROLLING RECORDABLE OPTICAL DISK DRIVE

BACKGROUND OF INVENTION

1. Field of the Invention

The present invention relates to a phase locked loop (PLL), and more specifically, to a method for using a PLL in a recordable optical disk drive to perform phase shift detection while recording to a recordable disk.

2. Description of the Prior Art

A phase locked loop is used for frequency control. Please refer to FIG. 1. FIG. 9 is a block diagram of a phase locked loop (PLL) 10 for controlling a recordable optical disk drive according to the prior art. The PLL 10 generates a clock signal CLK in response to a wobble signal WOBBLE. The wobble signal WOBBLE is extracted from the wobble tracks of a recordable optical disk, as shown in FIG. 2, and contains address information of the wobble tracks. The clock signal CLK is used to control the writing path of the recordable drive and is the reference for the recording clock. A period of the wobble signal WOBBLE corresponds to 186 periods of the clock signal CLK for a DVD-R/RW specification, and a period of the wobble signal WOBBLE corresponds to 32 periods of the clock signal CLK in a DVD+R/RW specification. To ensure synchronized writing data to the correct track at the right time, the PLL synchronizes the clock signal CLK with the wobble signal WOBBLE.

The PLL 10 contains a phase detector 12, which is used for comparing phases of the wobble signal WOBBLE and the clock signal CLK. Based on a phase difference between the wobble signal WOBBLE and the clock signal CLK, the phase detector 12 then outputs either an up signal UP or a down signal DN to a charge pump circuit 14. Based on receipt of either the up signal UP or the down signal DN, the charge pump circuit 14 sends or receives a control current to a loop filter 16. Next, a control voltage is outputted from the loop filter 16 and fed into a voltage controlled oscillator (VCO) 18. The VCO 18 generates the clock signal CLK with an output frequency based on the control voltage. An optional frequency divider 20 can be used for dividing the frequency of the clock signal CLK, and finally the clock signal CLK is fed back into the phase detector 12. Together, the phase detector 12, the charge pump circuit 14, the loop filter 16, the VCO 18, and the frequency divider 20 form the PLL 10, which is a feedback loop.

However, sometimes the PLL 10 cannot synchronize the phase of the clock signal CLK with the phase of the wobble signal WOBBLE due to a phase shift phenomenon. The phase shift phenomenon occurs due to a limit of the conventional phase detector 12. Please refer to FIG. 3A through FIG. 3E. FIG. 3A through FIG. 3E are phase shift diagrams illustrating operation of the phase detector 12 under various circumstances. Based on an input phase shift $\theta_e$, the phase detector 12 generates an output $u_d$ for correcting the phase shift $\theta_e$. The output $u_d$ is shown in FIG. 1 as either being the up signal UP or the down signal DN, and is used to synchronize the clock signal CLK with the wobble signal WOBBLE. As long as the phase shift $\theta_e$ is within a locking range a $\Delta w_L$ of the phase detector 12, the phase detector 12 is able to synchronize the clock signal CLK with the wobble signal WOBBLE. The locking range $\Delta w_L$ of the phase detector 12 is usually equal to a phase difference of plus or minus half a period of the wobble signal WOBBLE. As will be shown shortly, a problem occurs when the phase shift $\theta_e$ falls outside of the locking range $\Delta w_L$ of the phase detector 12.

In FIG. 3A, point 30 represents the output function of the phase detector 12. Because the phase shift $\theta_e$ has a value of 0, no action is needed by the phase 12 to correct the phase shift $\theta_e$, and the phase detector 12 outputs a corresponding output $u_d$ also having a value of 0. When the phase shift $\theta_e$ does not have a value of 0, the output function of the phase detector moves along the diagonal lines shown in FIG. 3A. When the phase shift $\theta_e$ becomes larger than the locking range $\Delta w_L$, the output function will follow the diagonal lines shown outside of the locking range $\Delta w_L$. Point 30 is located at a crossing point, which is where the diagonal lines of the output function pass through the axis representing the phase shift $\theta_e$, and each crossing point has an output $u_d$ of 0.

The job of the phase detector 12 is to correct the phase shift $\theta_e$ such that the phase shift $\theta_e$ always locks onto the point 30 shown in FIG. 3A since this is the only way the phase shift $\theta_e$ will have a value of 0. As long as the phase shift $\theta_e$ is within the locking range $\Delta w_L$, the phase detector 12 will track and lock the phase shift $\theta_e$ to have a value of 0. Notice that just because the output $u_{d\ d}$ has a value of 0, it does not necessarily imply that the phase shift $\theta_e$ has a value of 0.

In FIG. 3B, point 32 shows a case in which the inputted phase shift $\theta_e$ has a value greater than 0, but is still within the locking range $\Delta w_L$. Since point 32 is not located on a crossing point, the phase detector 12 will generate the output $u_d$ in order to lock the phase shift $\theta_e$ onto the nearest crossing point. FIG. 3C shows the result of this, and point 34 shows the locking of the phase shift $\theta_e$ onto the crossing point in the middle of the locking range $\Delta w_L$. Since point 32 in FIG. 3B was within the locking range $\Delta w_L$, point 34 in FIG. 3C is locked to the crossing point in the locking range $\Delta w_L$, and not locked to one of the crossing points outside of the locking range $\Delta w_L$.

FIG. 3D and FIG. 3E show the problems that arise when the phase shift $\theta_e$ is not in the locking range $\Delta w_L$. In FIG. 3D, point 36 shows a case in which the inputted phase shift $\theta_e$ has a value greater than 0, and is not within the locking range $\Delta w_L$. Since point 36 is not located on a crossing point, the phase detector 12 will generate the output $u_d$ in order to lock the phase shift $\theta_e$ onto the nearest crossing point. FIG. 3E shows the result of this, and point 38 shows the locking of the phase shift $\theta_e$ onto the crossing point that is immediately to the right of the locking range $\Delta w_L$. Since point 36 in FIG. 3D was to the right of the locking range $\Delta w_L$, point 38 in FIG. 3E is locked to the crossing point to the right of the locking range $\Delta w_L$, and not the crossing points in the middle of the locking range $\Delta w_L$.

Please refer to FIG. 4A through FIG. 4E. FIG. 4A through FIG. 4E are circular phase shift diagrams analogous to FIG. 3A through FIG. 3E, respectively. The circular phase diagrams of FIG. 4A through FIG. 4E are another way of representing the information in the phase diagrams of FIG. 3A through FIG. 3E, and are shown for convenience. In FIG. 4A to FIG. 4E, the dotted circles are used to represent a continuous, loop characteristic of the phase shift $\theta_e$. The horizontal line running through the dotted circle represents the locking range $\Delta w_L$. The right side of the horizontal line is labeled "0", and represents a phase shift $\theta_e$ of $0+n * \Delta w_L$, where n is an integer such as 1, 2, 3, etc. The left side of the horizontal line is labeled "$\pm\frac{1}{2} \Delta w_L$", and represents, a phase shift $\theta_e$ of $\frac{1}{2} \Delta w_L \pm m * \Delta w_L$, where m is also an integer such as 1, 2, 3, etc.

In FIG. 4A, point 40 represents the output function of the phase detector 12. Because the phase shift $\theta_e$ has a value of 0, no action is needed by the phase 12 to correct the phase shift $\theta_e$, and the phase detector 12 outputs a corresponding output $u_d$ also having a value of 0. Please notice that just because the output $u_d$ has a value of 0, it does not necessarily imply that the phase shift $\theta_e$ has a value of 0. The phase shift $\theta_e$ could also have a value of 0+n * $\Delta w_L$.

In FIG. 4B, point 42 shows a case in which the inputted phase shift $\theta_e$ has a value greater than 0, but is still less than ½ $\Delta w_L$. Since at point 42 the phase shift $\theta_e$ does not have a value of 0+n * $\Delta w_L$ the phase detector 12 will generate the output $u_d$ in order to lock the phase shift $\theta_e$ onto the nearest crossing point with a phase shift $\theta_e$ value of 0+n * $\Delta w_L$ Note that in FIG. 4B, both the phase shift $\theta_e$ and the output $u_d$ have a positive value.

FIG. 4C illustrates the result of the phase detector 12 correcting the phase shift $\theta_e$ present in FIG. 4B. Point 44 shows the locking of the phase shift $\theta_e$ onto the crossing point in the middle of the locking range $\Delta w_L$ Since point 42 in FIG. 4B has a phase shift $\theta_e$ less than ½ $\Delta w_L$ point 44 in FIG. 4C is locked to the crossing point in the locking range $\Delta w_L$ and not one of the crossing points outside of the locking range $\Delta w_L$ Therefore, as long as the phase shift $\theta_e$ is less than ±½ $\Delta w_L$, the phase detector 12 can reduce the phase shift $\theta_e$ to a value of 0.

FIG. 4D and FIG. 4E show the problems that arise when the phase shift $\theta_e$ is not less than ±½ $\Delta w_L$ In FIG. 4D, point 46 shows a case in which the inputted phase shift $\theta_e$ has a value greater than ½ $\Delta w_L$, and is not within the locking range $\Delta w_L$. Since point 46 is not located on a crossing point, the phase detector 12 will generate the output $u_d$ in order to lock the phase shift $\theta_e$ onto the nearest crossing point. Note that in FIG. 4D the phase shift $\theta_e$ has a positive value, but the output $u_d$ has a negative value.

FIG. 4E shows result of the phase detector 12 correcting the phase shift $\theta_e$ present in FIG. 4D. Point 48 shows the locking of the phase shift $\theta_e$ onto the crossing point that was closest to the phase shift $\theta_e$. Since point 46 in FIG. 4D was greater than ½ $\Delta w_L$, point 48 in FIG. 4E is locked to the crossing point in which the output $u_d$ has a value of 0 and the phase shift $\theta_e$ has a value of $\Delta w_L$. Once the output function of the phase detector 12 is locked to point 48, it is very difficult for the phase detector 12 to correctly eliminate the phase shift $\theta_e$.

One of the problems with not eliminating the phase shift $\theta_e$ between the wobble signal WOBBLE and the clock signal CLK is the clock signal CLK will have the incorrect period required for correctly recording data onto an optical disk. If the period of the clock signal CLK is too long, the density of data stored on the optical disk will be to small. On the other hand, if the period of the clock signal CLK is too short, the density of data stored on the optical disk will be too high. For an illustration of this problem, please refer to FIG. 5. FIG. 5 is diagram showing the effects of recording data onto an optical disk while using a clock signal CLK with an incorrect period. FIG. 5 illustrates three cases. The first case is an ideal case in which the clock signal CLK is in phase with the wobble signal WOBBLE and properly records data onto the optical disk. As shown in FIG. 5, the optical disk is shown as having three blocks labeled as block 1 of disk, block 2 of disk, and block 3 of disk. In the ideal case, each data block to be written onto the optical disk (such as DATA block 1) is written such that the data block exactly fits into each corresponding block of the optical disk. Therefore, there are no data blocks that are partially written into more than one block of the optical disk.

In the second and third cases, the frequency of the clock signal CLK is not in phase with the wobble signal WOBBLE, and has a period that is too long. When the period of the clock signal CLK is too long, there are two main schemes for dealing with the situation. The first is to connect the beginning of new data blocks to the end of previously written data blocks. However, the problem with this scheme is the location of all subsequent data blocks will be shifted, and will not properly fit into each block of the optical disk. The second scheme is to ignore the ending location of the previous data block and to align the beginning location of new data blocks with the position of the block on the disk. Unfortunately, the problem with this scheme is data will overlap and the data in the new data block will overwrite part of the data contained in the previous data block.

Other prior art devices and methods% have been used to help correct the problem of misaligning data blocks onto blocks of optical disks. In U.S. Pat. No. 6,269,059 entitled "Apparatus for and method of adding information onto recording medium that enables additional recording", Kuroda et al. disclose a prior art apparatus and method for recording information on a recording medium, which is included herein by reference Kuroda et al. teach a recordable optical disk drive that uses pre-pits stored in an optical disk to synchronize and align data blocks to be written to the disk with corresponding blocks on the disk. The pre-pits on the optical disk contain physical address information about the corresponding blocks of the optical disk. By decoding the address information stored in the pre-pits, the recordable optical disk drive can record new data blocks onto the optical disk such that each new data block is written at the beginning of each corresponding block on the disk. By using the pre-pits to synchronize data with the corresponding blocks on the disk, the recordable optical disk drive can overcome any phase shift $\theta_e$ that exists between the wobble signal WOBBLE and the clock signal CLK.

However, to take advantage of the physical address information stored in the pre-pits of the optical disk, the recordable optical disk drive requires a physical address decoder to decode the physical address information. The use of the physical address decoder means that extra hardware is required for the recordable optical disk drive, and thereby increases the price and complexity of the recordable optical disk drive. Another problem with the prior art method proposed by Kuroda et al. is the need to wait for each pre-pit in order to synchronize. After the physical address information is decoded from a pre-pit, there is no way to synchronize data blocks written to the optical disk until the next pre-pit is decoded. Moreover, address decoding is not always completely reliable, and address decoding requires sophisticated address prediction in order to compensate for problems that arise when decoding physical addresses.

SUMMARY OF INVENTION

It is therefore a primary objective of the claimed invention to provide a method of generating an output signal from a phase locked loop (PLL) such that the output signal maintains a substantially constant phase difference with respect to a phase of a reference signal in order to solve the above-mentioned problems.

According to the claimed invention, a method of generating an output signal from a phase locked loop (PLL) such that the output signal maintains a substantially constant phase difference with respect to a phase of a reference signal is introduced. The PLL comprises a phase detector for comparing phases of the output signal and the reference signal with each other and producing a corresponding comparison signal, a charge pump for receiving the comparison signal from the phase detector and producing a control current based on the comparison signal, a loop filter for receiving the control current from the charge pump and producing a corresponding control voltage, and a voltage controlled oscillator (VCO) for receiving the control voltage from the loop filter and producing an oscillation signal based on the control voltage. The PLL further comprises a first frequency divider for dividing a frequency of the oscillation signal by a first divisor, and for generating a number of multiphase signals, such that each multiphase signal is out of phase with each of the other multiphase signals, a phase adjusting circuit for selecting one of the multiphase signals generated by the first frequency divider to be the output signal, and a phase shift detection circuit for comparing a phase of the oscillation signal with the phase of the reference signal. The present invention method comprises steps: the phase shift detection circuit sampling the phase difference between the oscillation signal and the reference signal a predetermined number of times during each period of the reference signal and storing each of the phase differences in a memory in order to calculate a total phase difference between the oscillation signal and the reference signal at the end of each period of the reference signal; the phase shift detection circuit generating an adjustment control signal in response to the total phase difference between the oscillation signal and the reference signal; and the phase adjusting circuit selecting one of the multiphase signals to be the output signal according to instructions in the adjustment control signal, and outputting the output signal to the phase detector, wherein the output signal is selected such that a phase difference between the output signal and the reference signal is greater than the total phase difference between the oscillation signal and the reference signal for causing the phase detector to reduce the phase difference between the oscillation signal and the reference signal.

It is an advantage of the claimed invention that the method can synchronize the reference signal with the output signal, even if the phase difference between the oscillation signal and the reference signal exceeds half of the period of the reference signal, which is the limit of a conventional phase detector. The clock signal can therefore stay in phase with the wobble signal, and data blocks can be correctly written to corresponding blocks on an optical disk. It is also an advantage that the phase difference between the wobble signal and the clock signal can be calculated in real time, eliminating the need to wait for a pre-pit for synchronization which was the case in the prior art.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 6:
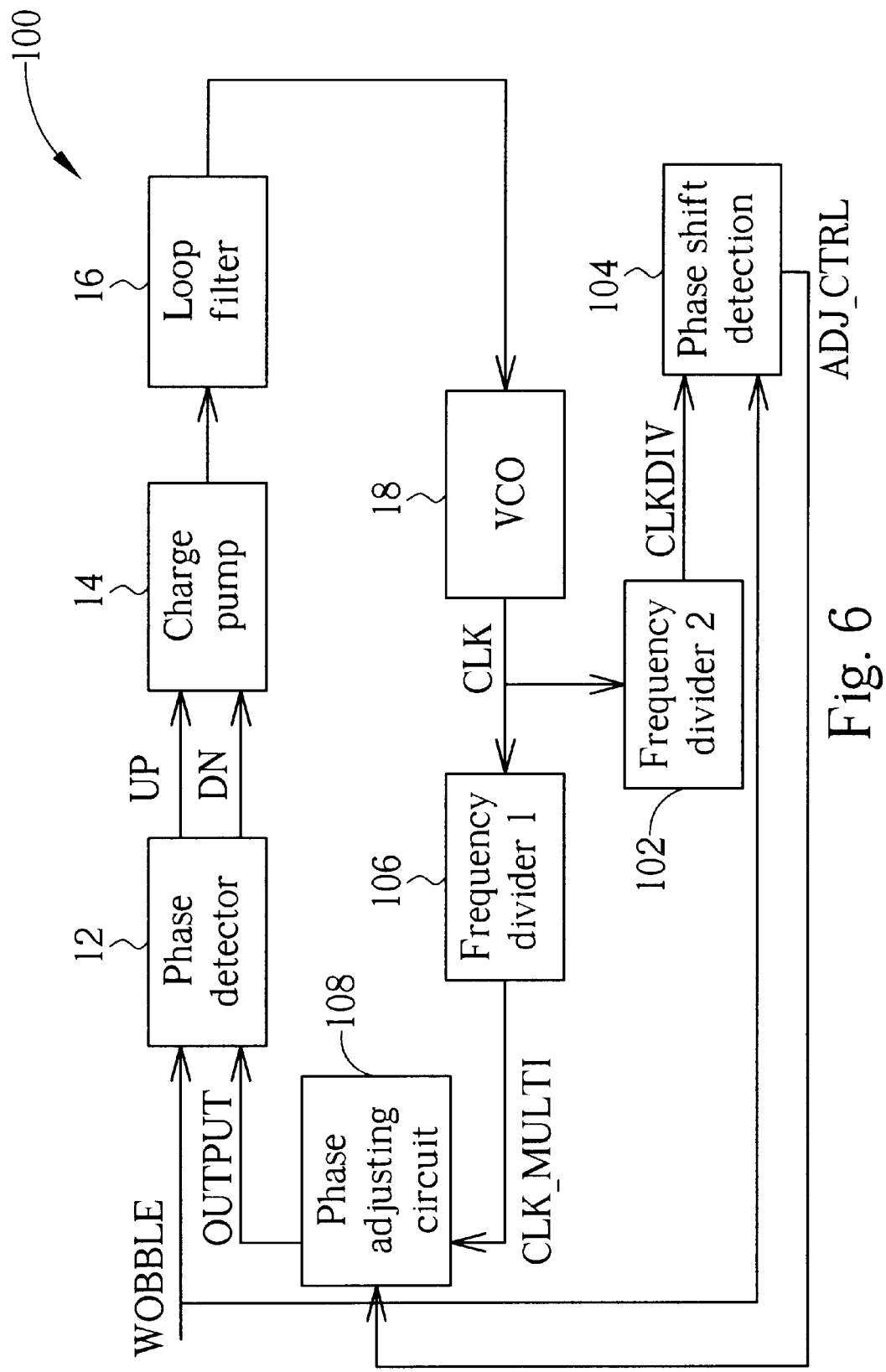
FIG. 6 is block diagram of a PLL according to the present invention.

Please refer to FIG. 6. FIG. 6 is block diagram of a phase locked loop (PLL) 100 according to the present invention. The phase detector 12, the charge pump 14, the loop filter 16, and the VCO 18 of the prior art PLL 10 are also used in the present invention PLL 100. Operation of each device is the same as with the prior art, and for brevity will not be described again. In addition to these components, the PLL 100 also contains a first frequency divider 106, a second frequency divider 102, a phase shift detection circuit 104, and a phase adjusting circuit 108.

Upon receiving the control voltage from the loop filter 16, the VCO 18 generates the clock signal CLK. This clock signal CLK is then inputted into the first frequency divider 106 and the second frequency divider 102. The first frequency divider 106 divides the clock signal CLK into a set of multiphase signals CLK_MULTI and the second frequency divider 102 divides the clock signal CLK into a divided clock signal CLKDIV.

Each of the multiphase signals CLK_MULTI that the first frequency divider 106 generates is out of phase with each of the other multiphase signals CLK_MULTI and a phase difference between each consecutive pair of multiphase signals CLK_MULTI is equal. For example, in the DVD+R/RW specification, the first frequency divider 106 would have a divisor of 32, and would therefore create 32 multiphase signals CLK_MULTI. Each of the 32 multiphase signals CLK_MULTI would have different phase differences with respect to the clock signal CLK, and each of the multiphase signals CLK_MULTI would be offset by multiples of the period of the clock signal CLK from all other multiphase signals CLK_MULTI. Unlike the first frequency divider 106, the second frequency divider 102 does not need to generate multiphase signals. For the following disclosure, the second frequency divider 102 will be explained as having a divisor of 4, although other divisors could also be used with the present invention.

Figure 7:
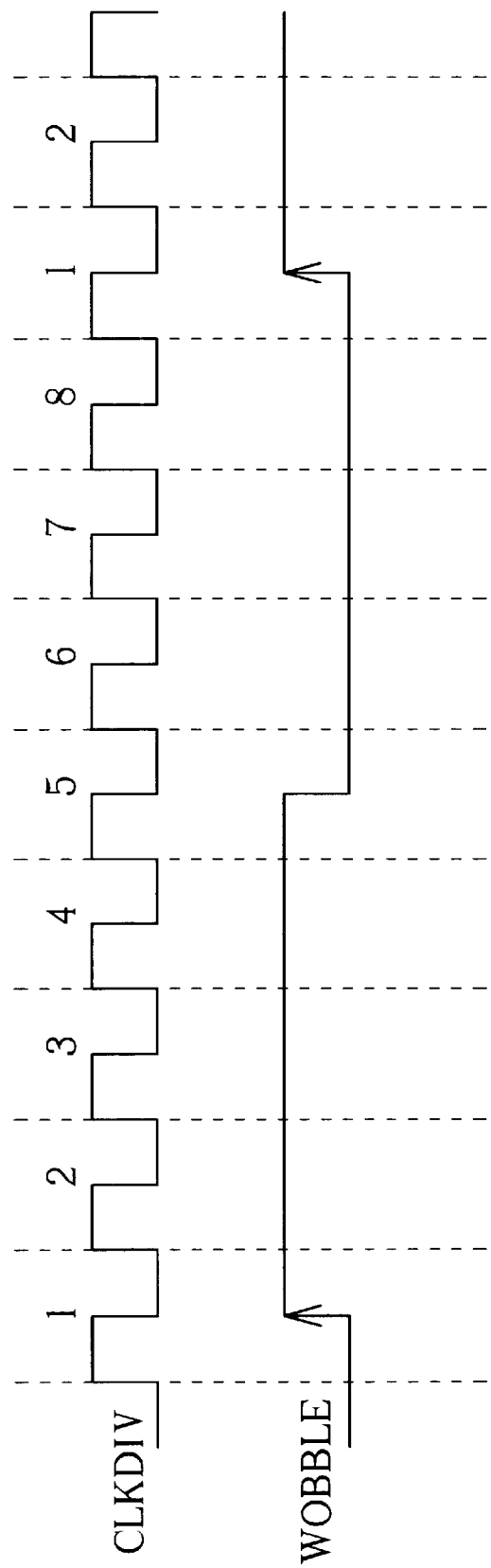
FIG. 7 is a timing diagram illustrating a relationship between a wobble signal and a divided clock signal.

Please refer to FIG. 7 with reference to FIG. 6. FIG. 7 is a timing diagram illustrating a relationship between the wobble signal WOBBLE and the divided clock signal CLKDIV As shown in FIG. 6, the wobble signal WOBBLE is produced by using the first frequency divider 106 to divide the clock signal CLK by a factor of 32. Also, the divided clock signal CLKDIV is produced by using the second frequency divider 102 to divide the clock signal CLK by a factor of 4. Therefore, as shown in FIG. 7, the wobble signal WOBBLE has a period that is 8 times of the period of the divided clock signal CLKDIV. As will be seen below, by running the divided clock signal CLKDIV at a multiple of the wobble signal WOBBLE, the present invention PLL 100 is able to more effectively reduce phase difference between the clock signal CLK and the wobble signal WOBBLE.

An advantage of the period of the divided clock signal CLKDIV being a fraction of the period of the wobble signal WOBBLE is that the phase shift detection circuit 104 can use the divided clock signal CLKDIV along with the wobble signal WOBBLE to help detect any phase shift $\theta_e$ between the clock signal CLK outputted from the VCO 18 and the wobble signal WOBBLE. In order to do this, both the divided clock signal CLKDIV and the wobble signal WOBBLE are inputted into the phase shift detection circuit 104. As shown in FIG. 7, for each period of the wobble signal WOBBLE, there are eight numbered periods of the divided clock signal CLKDIV, labeled as period 1 to period 8. The phase shift detection circuit 104 is triggered by a rising edge of the wobble signal WOBBLE to detect which period of the divided clock signal CLKDIV the rising edge of the wobble signal WOBBLE is most closely synchronized with. When the clock signal CLK and the wobble signal WOBBLE are in phase with each other, the phase shift detection circuit 104 determines which period of the divided clock signal CLKDIV the wobble signal WOBBLE is synchronized with, and stores it in an internal memory of the phase shift detection circuit 104. By detecting which period of the divided clock signal CLKDIV the rising edge of the wobble signal WOBBLE is most closely synchronized with, and storing this information in the memory, the phase shift detection circuit 104 is able to effectively track the phase shift $\theta_e$ between the clock signal CLK and the wobble signal WOBBLE, even if the phase shift $\theta_e$ exceeds the locking range $\Delta w_L$ of the phase shift detection circuit 104. Based on the detected phase shift $\theta_e$ between the clock signal CLK and the wobble signal WOBBLE, the phase shift detection circuit 104 outputs a adjustment control signal ADJ_CTRL to the phase adjusting circuit 108 in order to correct the phase shift $\theta_e$ and synchronize the clock signal CLK with the wobble signal WOBBLE.

Figure 4:
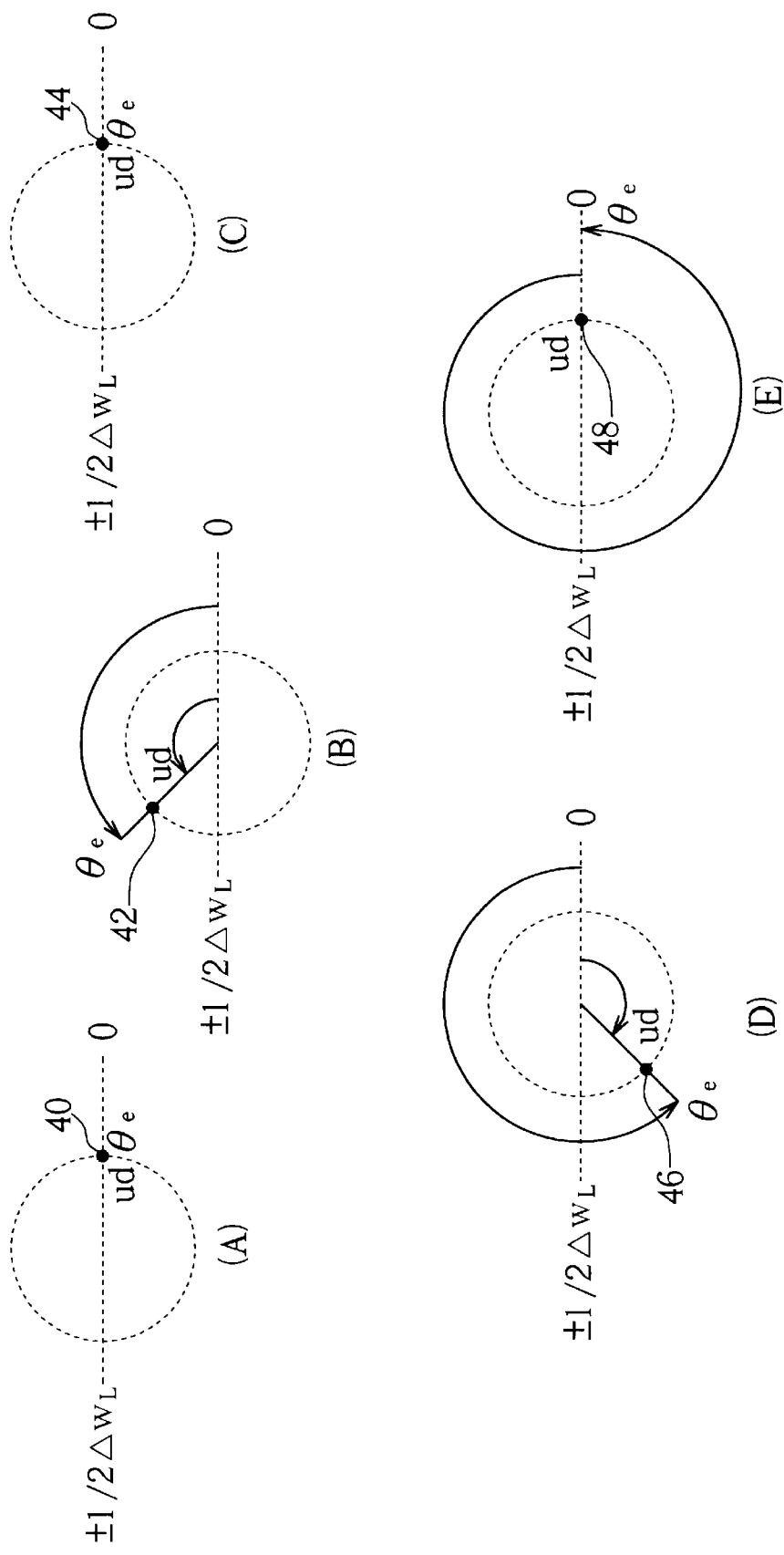
FIG. 4A through FIG. 4E are circular phase shift diagrams analogous to FIG. 3A through FIG. 3E, respectively.
Figure 5:
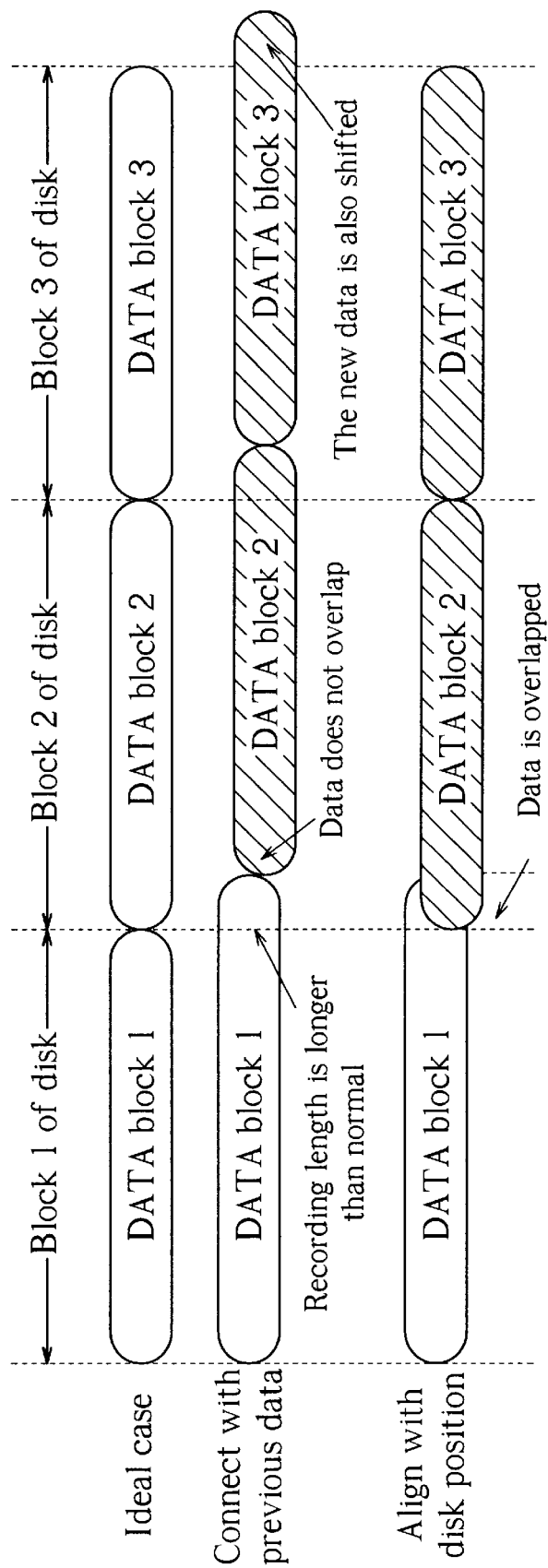
FIG. 5 is diagram showing the effects of recording data onto an optical disk while using a clock signal with an incorrect period.
Figure 8:
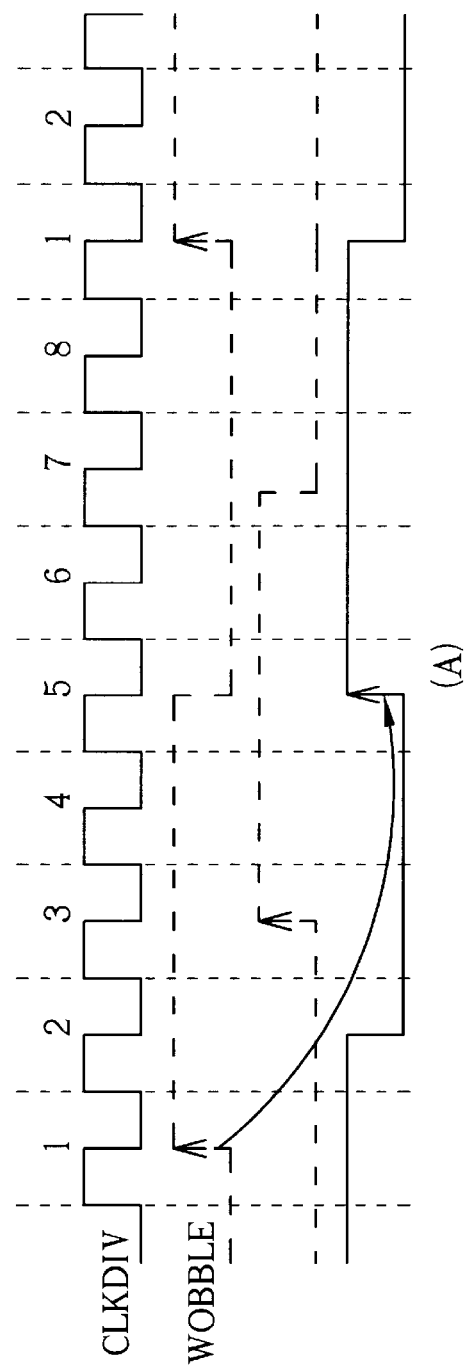
FIG. 8A is timing diagram illustrating an example of how a phase shift detection circuit detects phase shift between a clock signal and the wobble signal according to the present invention.
FIG. 8B is a circular phase diagram corresponding to FIG. 8A.
Figure 8:
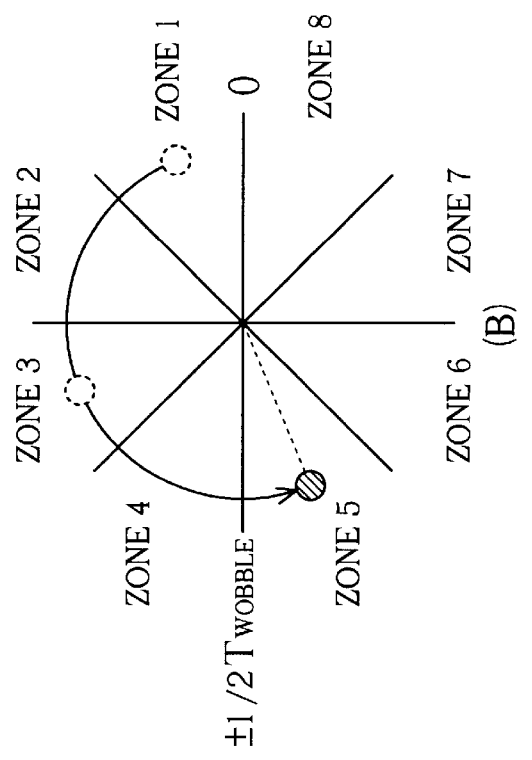

Please refer to FIG. 8A and FIG. 8B. FIG. 8A is timing diagram illustrating an example of how the phase shift detection circuit 104 detects phase shift $\theta_e$ between the clock signal CLK and the wobble signal WOBBLE according to the present invention. FIG. 8B is a circular phase diagram corresponding to FIG. 8A. The example shown in FIG. 8A and FIG. 8B is similar to that shown in FIG. 4D. Recall that the prior art PLL 10 was unable to correct a phase shift $\theta_e$ that was larger than half of the period of the wobble signal WOBBLE, and instead locked the phase shift $\theta_e$ to the situation shown in FIG. 4E, where the phase difference was locked at being equal to a full period of the wobble signal WOBBLE.

Just as in FIG. 7, in FIG. 8A the eight periods of the divided clock signal CLKDIV corresponding to one period of the wobble signal WOBBLE are labeled period 1 to period 8. In FIG. 8B, eight corresponding zones are shown on the circular phase diagram, and are labeled as Zone 1 to Zone 8.

As shown in FIG. 8A, originally the phase shift detection circuit 104 detects that the rising edge of the wobble signal WOBBLE is synchronized with period 1 of the divided clock signal CLKDIV, as is indicated by the first dotted line clock pulse representing the wobble signal WOBBLE. Next, the phase shift detection circuit 104 detects that the rising edge of the wobble signal WOBBLE is synchronized with period 3 of the divided clock signal CLKDIV, which is indicated by the second dotted line clock pulse representing the wobble signal WOBBLE. Finally, the phase shift detection circuit 104 detects that the rising edge of the wobble signal WOBBLE is synchronized with period 5 of the divided clock signal CLKDIV, which is indicated by the solid line clock pulse representing the wobble signal WOBBLE.

FIG. 8B is provided for convenience to illustrate how the phase shift detection circuit 104 detects the change of phase shift $\theta_e$ between the clock signal CLK and the wobble signal WOBBLE. Originally, the rising edge of the wobble signal WOBBLE was synchronized with period 1 of the divided clock signal CLKDIV, so the wobble signal WOBBLE is shown as being in Zone 1. Next the rising edge of the wobble signal WOBBLE was synchronized with period 3 of the divided clock signal CLKDIV, so the wobble signal WOBBLE is shown as being in Zone 3. Finally, the rising edge of the wobble signal WOBBLE was synchronized with period 5 of the divided clock signal CLKDIV, so the wobble signal WOBBLE is shown as being in Zone S. Note that at this point the phase shift $\theta_e$ between the clock signal CLK and the wobble signal WOBBLE is greater than half a period of the wobble signal WOBBLE. Not only can the phase shift detection circuit 104 detect what zone the rising edge of the wobble signal WOBBLE is in, but more importantly the phase shift detection circuit 104 can detect the path that describes the phase shift $\theta_e$, even if the phase shift $\theta_e$ is more than one or several periods of the wobble signal WOBBLE. By studying the path, the phase shift detection circuit 104 can determine what the exact phase shift $\theta_e$ between the clock signal CLK and the wobble signal WOBBLE is, and not lock the phase shift $\theta_e$ to an incorrect phase difference.

Figure 9:
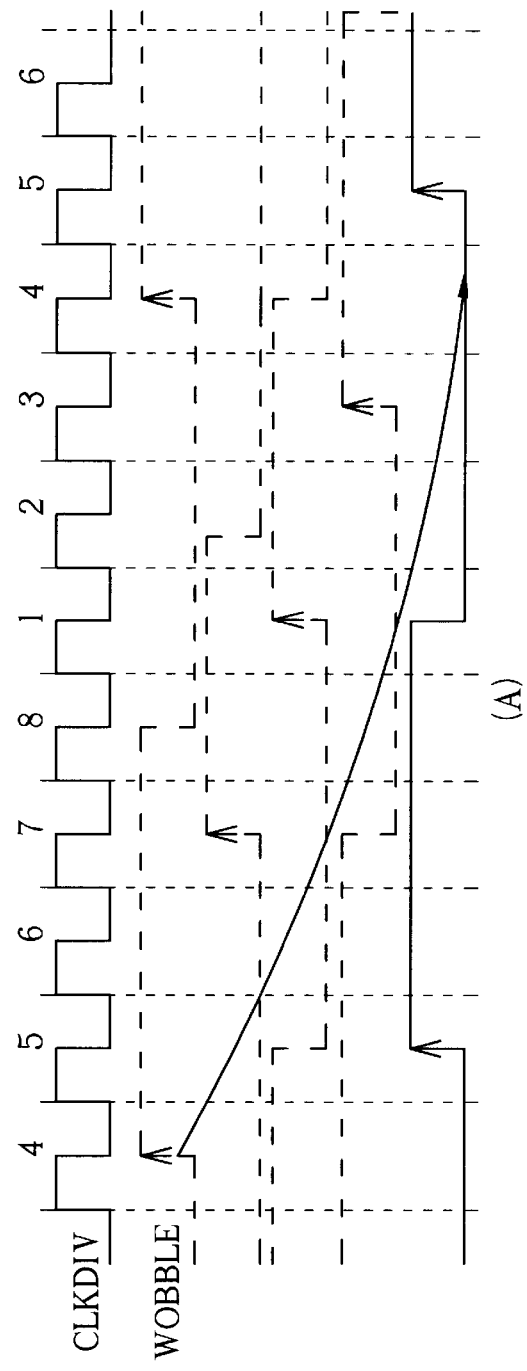
FIG. 9A is timing diagram illustrating another example of how the phase shift detection circuit detects phase shift between the clock signal and the wobble signal according to the present invention.
FIG. 9B is a circular phase diagram corresponding to FIG. 9A.
Figure 9:
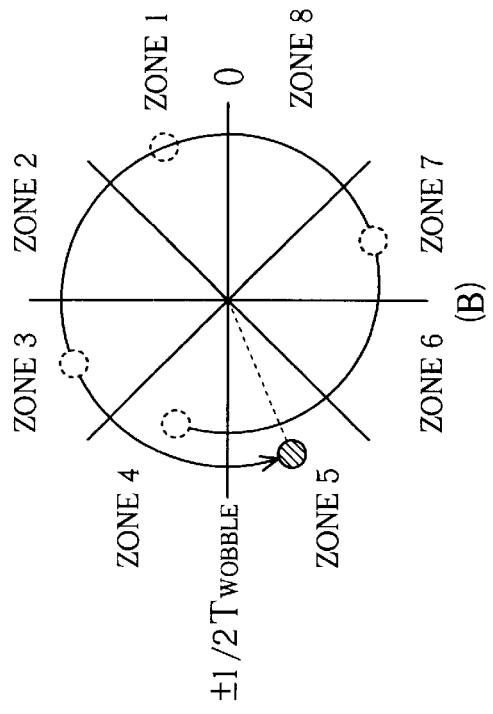

Please refer to FIG. 9A and FIG. 9B. FIG. 9A is timing diagram illustrating another example of how the phase shift detection circuit 104 detects phase shift $\theta_e$ between the clock signal CLK and the wobble signal WOBBLE according to the present invention. FIG. 9B is a circular phase diagram corresponding to FIG. 9A.

As shown in FIG. 9A, originally the phase shift detection circuit 104 detects that the rising edge of the wobble signal WOBBLE is synchronized with period 4 of the divided clock signal CLKDIV, as is indicated by the first dotted line clock pulse representing the wobble signal WOBBLE. Next, the phase shift detection circuit 104 detects that the rising edge of the wobble signal WOBBLE is synchronized with period 7 of the divided clock signal CLKDIV, which is indicated by the second dotted line clock pulse representing the wobble signal WOBBLE. Then, the phase shift detection circuit 104 detects that the rising edge of the wobble signal WOBBLE is synchronized with period 1 of the divided clock signal CLKDIV, which is indicated by the third dotted line clock pulse representing the wobble signal WOBBLE. Next, the phase shift detection circuit 104 detects that the rising edge of the wobble signal WOBBLE is synchronized with period 3 of the divided clock signal CLKDIV, which is indicated by the fourth dotted line clock pulse representing the wobble signal WOBBLE. Finally, the phase shift detection circuit 104 detects that the rising edge of the wobble signal WOBBLE is synchronized with period 5 of the divided clock signal CLKDIV, which is indicated by the solid line clock pulse representing the wobble signal WOBBLE.

Referring to FIG. 9B, originally the rising edge of the wobble signal WOBBLE was synchronized with period 4 of the divided clock signal CLKDIV, so the wobble signal WOBBLE is shown as being in Zone 4. Next the rising edge of the wobble signal WOBBLE was synchronized with period 7 of the divided clock signal CLKDIV, so the wobble signal WOBBLE is shown as being in Zone 7. Then the rising edge of the wobble signal WOBBLE was synchronized with period 1 of the divided clock signal CLKDIV, so the wobble signal WOBBLE is shown as being in Zone 1. Next the rising edge of the wobble signal WOBBLE was synchronized with period 3 of the divided clock signal CLKDIV, so the wobble signal WOBBLE is shown as being in Zone 3. Finally, the rising edge of the wobble signal WOBBLE was synchronized with period 5 of the divided clock signal CLKDIV, so the wobble signal WOBBLE is shown as being in Zone 5. Note that at this point the phase shift between the clock signal CLK and the wobble signal WOBBLE is greater than one period of the wobble signal WOBBLE.

The above two examples show how the phase shift detection circuit 104 is able to detect the total phase shift $\theta_e$ between the clock signal CLK and the wobble signal WOBBLE. Then, based on the detected phase shift $\theta_e$, the phase shift detection circuit 104 outputs the adjustment control signal ADJ_CTRL to the phase adjusting circuit 108 so that the phase adjusting circuit 108 can choose one of the multiphase signals CLK_MULTI outputted from the first frequency divider 106 to be the output signal OUTPUT. Depending on the direction and the magnitude of the phase shift $\theta_e$, the adjustment control signal ADJ_CTRL instructs the phase adjusting circuit 108 to choose one of the multiphase signals CLK_MULTI to be outputted to the phase detector 12 as the output signal OUTPUT. The chosen signal of the multiphase signals CLK_MULTI is chosen such that a phase difference between the output signal OUTPUT and the wobble signal WOBBLE is greater than the phase difference between the clock signal CLK and the wobble signal WOBBLE, thus increasing the phase difference between the output signal OUTPUT and the wobble signal WOBBLE and causing the phase detector 12 to compensate for this increase and bring the clock signal CLK closer in phase with the wobble signal WOBBLE. This process is repeated until the phase difference between the clock signal CLK and the wobble signal WOBBLE is completely eliminated. For best results, a phase difference between the chosen multiphase signals in successive iterations should be less than half a period of the wobble signal WOBBLE so that the PLL 100 can lock the phase shift $\theta_e$ to the correct locking point. An illustration of how the adjustment control signal ADJ_CTRL is used will be given in FIG. 10A through FIG. 10G.

Figure 1:
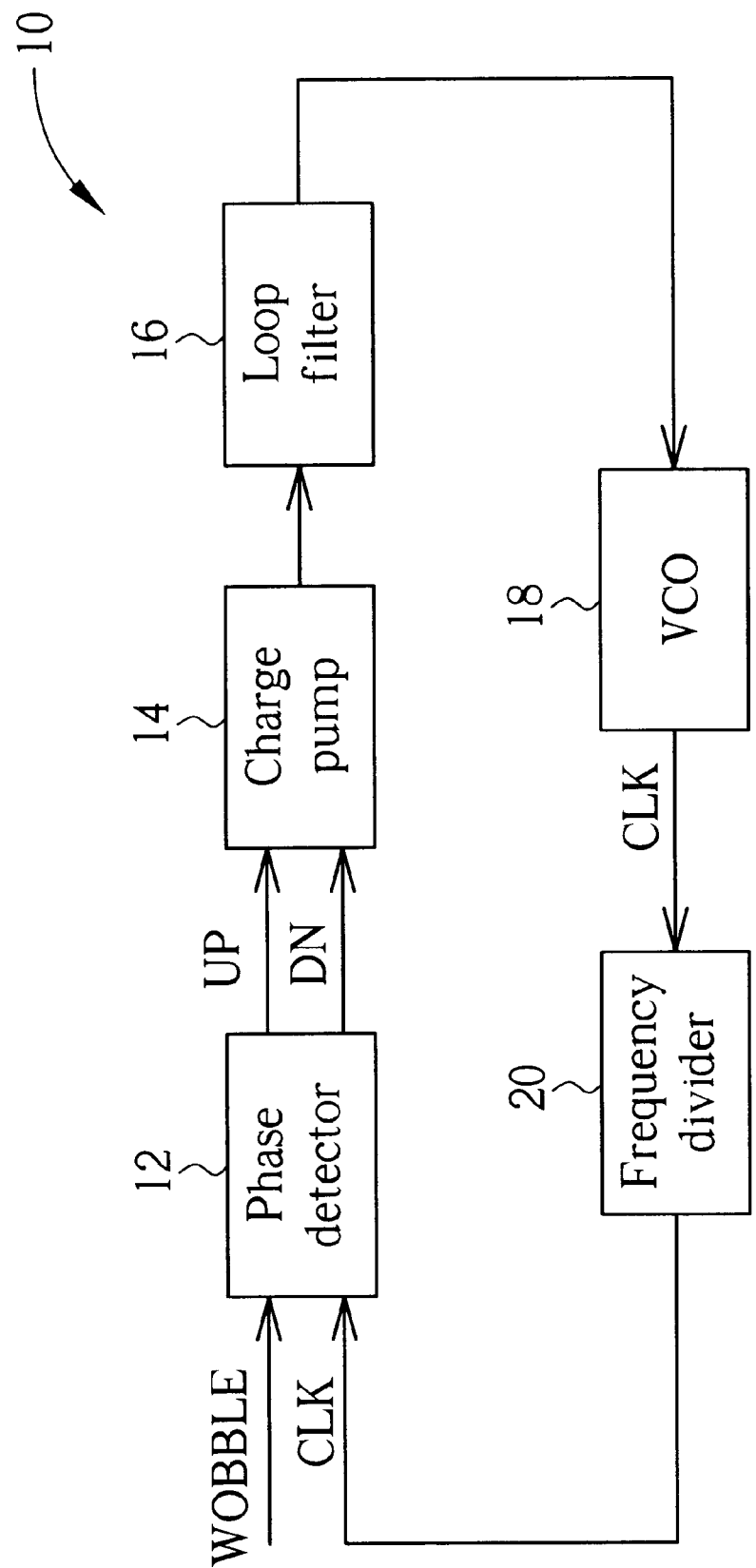
FIG. 1 is a block diagram of a phase locked loop (PLL) for controlling a recordable optical disk drive according to the prior art.
Figure 2:
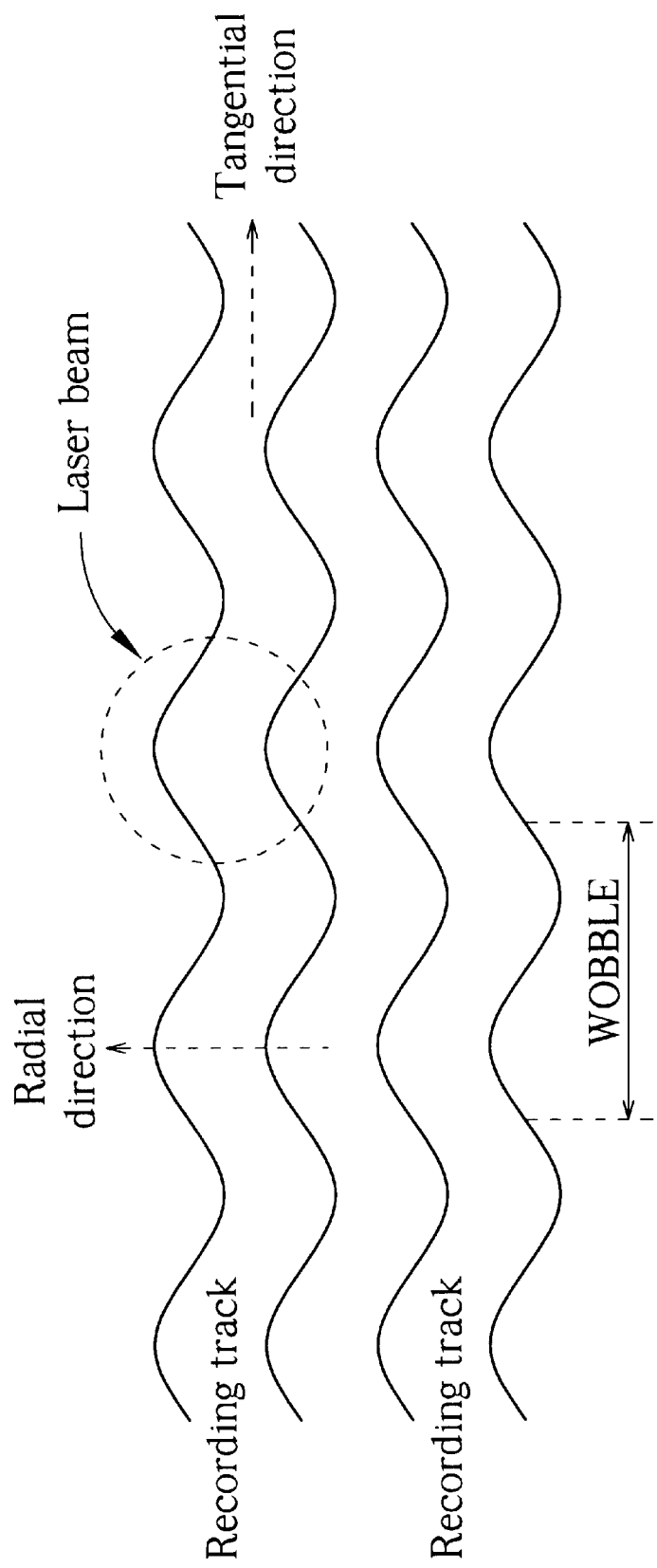
FIG. 2 is a diagram showing how a wobble signal is extracted from an optical disk.
Figure 3:
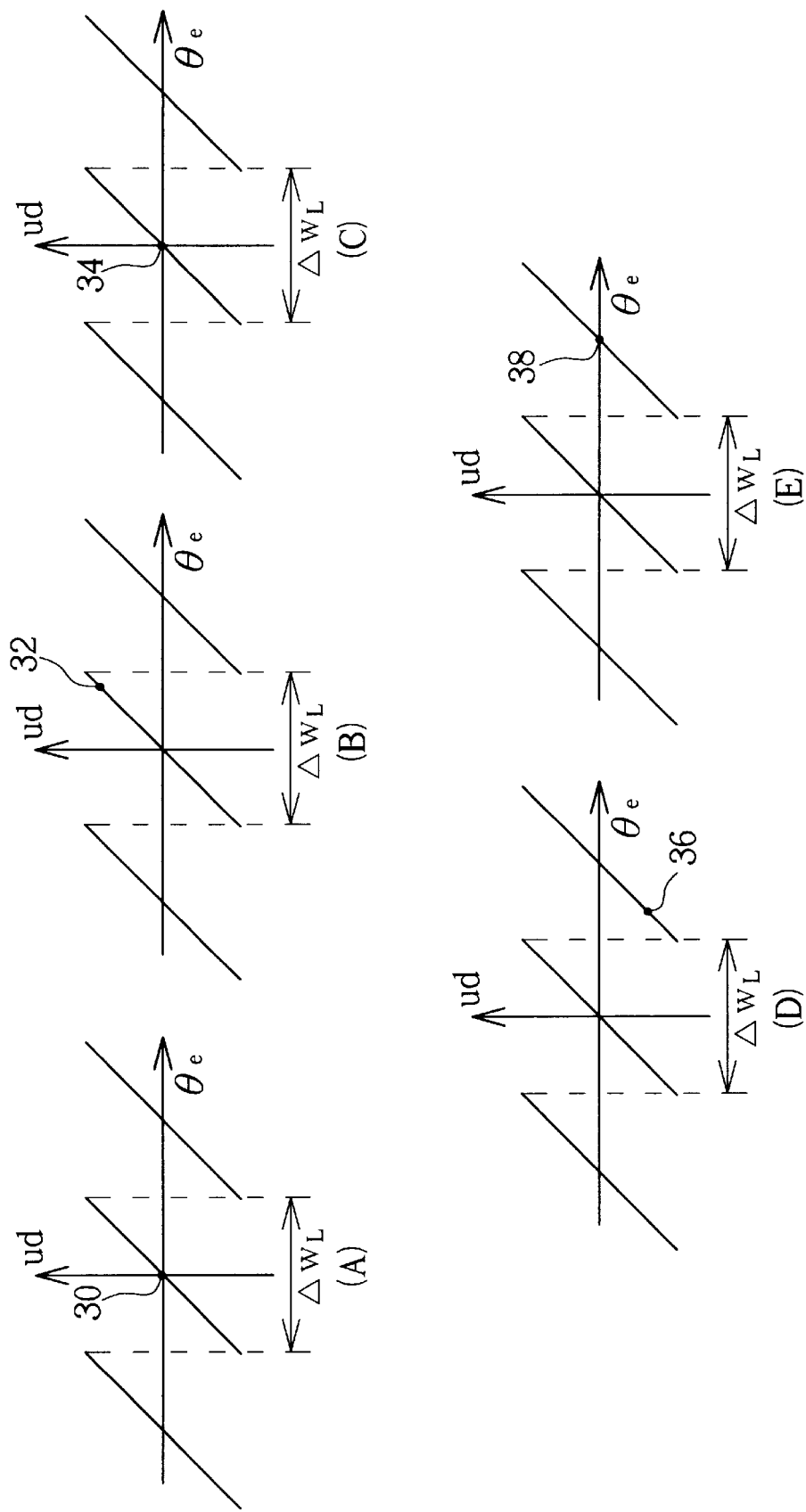
FIG. 3A through FIG. 3E are phase shift diagrams illustrating operation of a phase detector under various circumstances.
Figure 10:
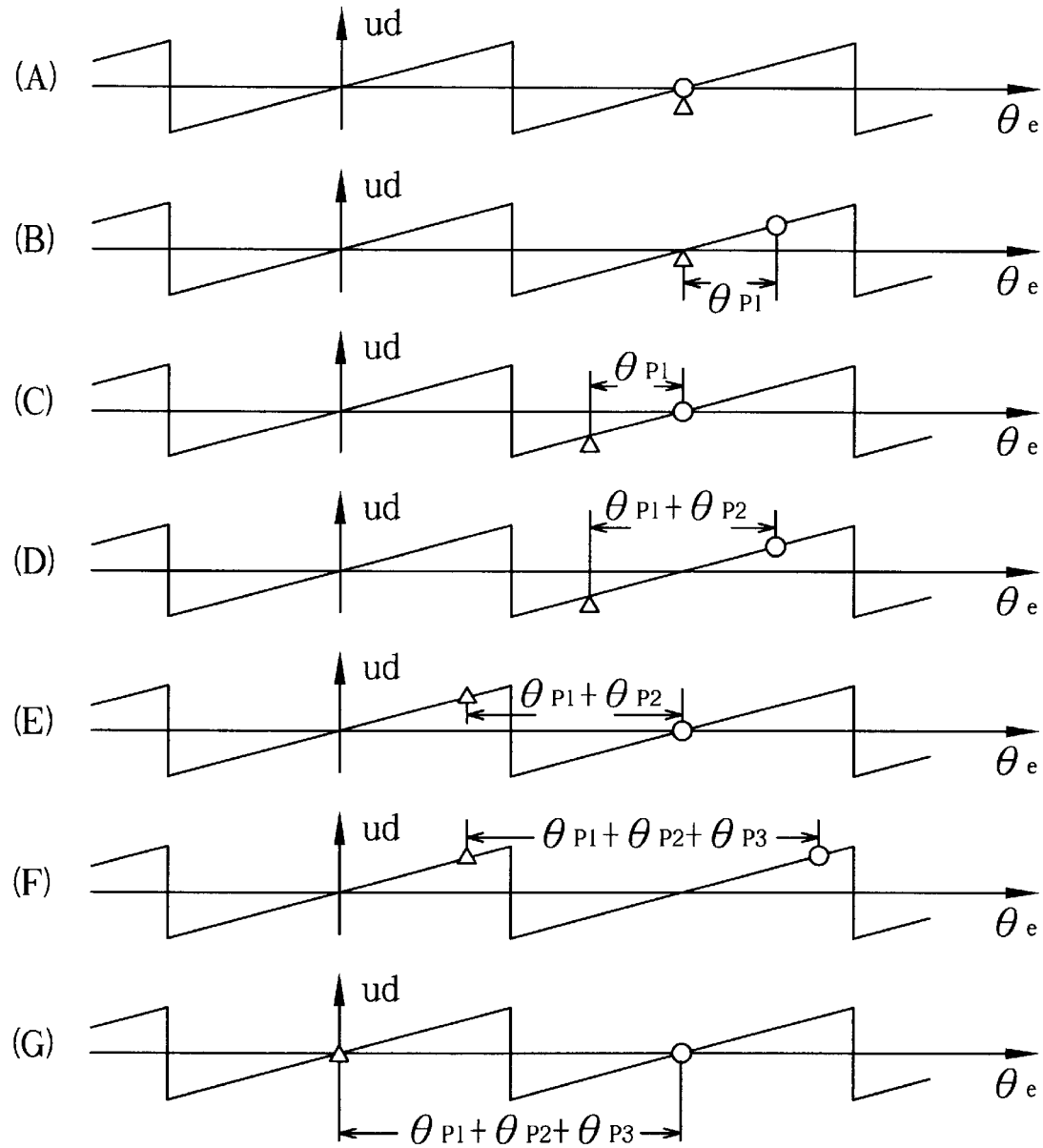
FIG. 10A through FIG. 10G are phase shift diagrams showing an example of how to correct a phase difference using the PLL of the present invention.

Please refer to FIG. 10A through FIG. 10G. FIG. 10A through FIG. 10G are phase shift diagrams showing an example of how to correct a phase difference using the PLL 100 of the present invention. In FIG. 10A through FIG. 10G, a circle ○ is used to designate the phase of the output signal OUTPUT outputted from the phase adjusting circuit 108 to the phase detector 12, and a triangle △ is used to designate the phase of the clock signal CLK. In FIG. 10A, a situation is shown is similar to that shown in FIG. 3E. That is, the phase of the clock signal CLK is locked to an incorrect crossing point, and a phase shift $\eta_e$ equal to one period of the wobble signal WOBBLE exists between the clock signal CLK and the wobble signal WOBBLE. Initially, the phase shift $\theta_e$ of output signal OUTPUT has the same phase shift $\theta_e$ as the clock signal CLK.

Starting in FIG. 10B, the PLL 100 is controlled to correct the phase shift $\theta_e$ between the clock signal CLK and the wobble signal WOBBLE. First of all, the adjustment control signal ADJ_CTRL instructs the phase adjusting circuit 108 to select one of the multiphase signals CLK_MULTI as the output signal OUTPUT such that a phase of $\theta_{p1}$ is added to the phase of the output signal OUTPUT. At this time, the total phase difference between the output signal OUTPUT and the clock signal CLK is equal to $\theta_{p1}$. Next, as shown in FIG. 10C, the PLL 100 takes action to minimize the output $u_d$ of caused by the output signal OUTPUT, and pushes the phase of the output signal OUTPUT back to the nearest crossing point. At this time, the total phase difference between the output signal OUTPUT and the clock signal CLK is equal to $\theta_{p1}$, but the overall phase shift $\theta_e$ of the clock signal CLK has been reduced.

Next, as shown in FIG. 10D, the adjustment control signal ADJ_CTRL instructs the phase adjusting circuit 108 to select one of the multiphase signals CLK_MULTI as the output signal OUTPUT such that a phase of $\theta_{p2}$ is added to the phase of the output signal OUTPUT. At this time, the total phase difference between the output signal OUTPUT and the clock signal CLK is equal to $\theta_{p1}+\theta_{p2}$. Next, as shown in FIG. 10E, the PLL 100 takes action again to minimize the output $u_d$ of caused by the output signal OUTPUT, and pushes the phase of the output signal OUTPUT back to the nearest crossing point. At this time, the total phase difference between the output signal OUTPUT and the clock signal CLK is still equal to $\theta_{p1}+\theta_{p2}$, but the overall phase shift $\theta_e$ of the clock signal CLK has been reduced.

Finally, as shown in FIG. 10F, the adjustment control signal ADJ_CTRL instructs the phase adjusting circuit 108 to select one of the multiphase signals CLK_MULTI as the output signal OUTPUT such that a phase of $\theta_{p3}$ is added to the phase of the output signal OUTPUT in order to completely remove the phase shift $\theta_e$ between the clock signal CLK and the wobble signal WOBBLE. At this time, the total phase difference between the output signal OUTPUT and the clock signal CLK is equal to $\theta_{p1}+\theta_{p2}+\theta_{p3}$. Next, as shown in FIG. 10G, the PLL 100 takes action again to minimize the output $u_d$ of caused by the output signal OUTPUT, and pushes the phase of the output signal OUTPUT back to the nearest crossing point. At this time, the total phase difference between the output signal OUTPUT and the clock signal CLK is still equal to $\theta_{p1}+\theta_{p2}+\theta_{p3}$, and the overall phase shift $\theta_e$ of the clock signal CLK has been eliminated.

The number of iterations of adding phases to the output signal OUTPUT and then using the PLL 100 to push the phase of the output signal OUTPUT back to the nearest crossing point depends on the magnitude of the original phase shift $\theta_e$ of the clock signal CLK. The example shown above used three iterations because the original phase shift $\theta_e$ of the clock signal CLK was only one crossing point away from being in e phase with the wobble signal WOBBLE. In a preferred embodiment of the present invention, the phase added to the output signal OUTPUT is less than half of a period of the wobble signal WOBBLE. This prevents the output signal OUTPUT from getting locked onto an incorrect crossing point, and ensures that the phase shift $\theta_e$ of the clock signal CLK becomes smaller and smaller with each iteration.

Compared to the prior art, the present invention PLL 100 uses the second frequency divider 102, the phase shift detection circuit 104 and the phase adjusting circuit 108 to synchronize the clock signal CLK with the wobble signal WOBBLE. The present invention method can synchronize the clock signal CLK with the wobble signal WOBBLE, even if the phase difference between the clock signal CLK and the wobble signal WOBBLE exceeds half of the period of the wobble signal WOBBLE. The clock signal CLK can therefore stay in phase with the wobble signal WOBBLE, and data blocks can be correctly written to corresponding blocks on an optical disk. It is also an advantage that the phase difference between the wobble signal WOBBLE and the clock signal CLK can be calculated in real time, eliminating the need to wait for a pre-pit for synchronization as was done in the prior art.

Those skilled in the art will readily observe that numerous modifications, and alterations of the device may be made while retaining the teachings of the invention. Accordingly, the above disclosure should be construed as limited only by the metes and bounds of the appended claims.

What is claimed is:

1. A phase locked loop (PLL) for generating an oscillation signal such that the oscillation signal maintains a substantially constant phase difference with respect to a phase of a reference signal, the PLL comprising:

a phase detector for comparing phases of an output signal and the reference signal with each other and producing a corresponding comparison signal;

a charge pump for receiving the comparison signal from the phase detector and producing a control current based on the comparison signal;

a loop filter for receiving the control current from the charge pump and producing a corresponding control voltage;

a voltage controlled oscillator (VCO) for receiving the control voltage from the loop filter and producing the oscillation signal based on the control voltage;

a phase shift detection circuit for detecting an amount of phase shift from a plurality of successive phase differences between the oscillation signal and the reference signal; and a phase adjusting circuit for adjusting a phase of the oscillation signal according to the amount of phase shift detected by the phase shift detection circuit to generate the output signal to the phase detector, for causing the phase shift between the oscillation signal and reference signal to be equal to a predetermined value.

2. The PLL of claim 1 wherein the phase shift detection circuit samples the phase difference between the oscillation signal and the reference signal a predetermined number of times during each period of the reference signal, and calculates the amount of phase shift between the oscillation signal and the reference signal according to these successive samples of the phase differences.

3. The PLL of claim 1 wherein the phase adjusting circuit contains a first frequency divider for dividing a frequency of the oscillation signal by a first divisor, and for generating a number of multiphase signals, such that each multiphase signal is out of phase with each of the other multiphase signals, and selects one of the multiphase signals to be the output signal to the phase detector according to the amount of phase shift detected by the phase shift detection circuit, for causing the phase detector to reduce the phase difference between the oscillation signal and the reference signal.

4. The PLL of claim 3 wherein the first frequency divider generates the multiphase signals such that a phase difference between each consecutive pair of multiphase signals is equal.

5. The PLL of claim 1 further comprising a second frequency divider for dividing a frequency of the oscillation signal by a second divisor in order to generate a divided oscillation signal, and the second frequency divider outputs the divided oscillation signal to the phase shift detection circuit, wherein the phase shift detection circuit samples a phase difference between the divided oscillation signal and the reference signal during each period of the divided oscillation signal and calculates the amount of phase shift between the oscillation signal and the reference signal at the end of each period of the reference signal.

6. The PLL of claim 1 being used in a recordable disk system, the reference signal is pre-recorded with a predetermined frequency on a recording track of the recordable disk, and the oscillation signal is a recording clock signal used to record data onto a recordable disk.

7. A phase locked loop (PLL) for generating an oscillation signal such that the oscillation signal maintains a substantially constant phase difference with respect to a phase of a reference signal, the PLL comprising:

a phase detector for comparing phases of an output signal and the reference signal with each other and producing a corresponding comparison signal;

a charge pump for receiving the comparison signal from the phase detector and producing a control current based on the comparison signal;

a loop filter for receiving the control current from the charge pump and producing a corresponding control voltage;

a voltage controlled oscillator (VCO) for receiving the control voltage from the loop filter and producing the oscillation signal based on the control voltage;

a first frequency divider for dividing a frequency of the oscillation signal by a first divisor, and for generating a number of multiphase signals, such that each multiphase signal is out of phase with each of the other multiphase signals;

a phase adjusting circuit for selecting one of the multiphase signals generated by the first frequency divider to be the output signal; and a phase shift detection circuit for comparing a phase of the oscillation signal with the phase of the reference signal, for sampling the phase difference between the oscillation signal and the reference signal a predetermined number of times during each period of the reference signal and storing each of the phase differences in a memory in order to calculate a total phase difference between the oscillation signal and the reference signal at the end of each period of the reference signal, for generating an adjustment control signal in response to the total phase difference between the oscillation signal and the reference signal, and for selecting one of the multiphase signals to be the output signal according to instructions in the adjustment control signal and outputting the output signal to the phase detector, wherein the output signal is selected such that a phase difference between the output signal and the reference signal is greater than the total phase difference between the oscillation signal and the reference signal for causing the phase detector to reduce the phase difference between the oscillation signal and the reference signal.

8. The PLL of claim 7 wherein the first frequency divider generates the multiphase signals such that a phase difference between each consecutive pair of multiphase signals is equal.

9. The PLL of claim 7 wherein the PLL further comprises a second frequency divider for dividing a frequency of the oscillation signal by a second divisor in order to generate a divided oscillation signal, and the second frequency divider outputs the divided oscillation signal to the phase shift detection circuit, wherein the phase shift detection circuit samples a phase difference between the divided oscillation signal and the reference signal during each period of the divided oscillation signal and stores each of the phase differences in the memory in order to calculate the total phase difference between the oscillation signal and the reference signal at the end of each period of the reference signal.

10. The PLL of claim 7 wherein the PLL is used in a recordable disk system, the reference signal is pre-recorded as a wobbling of a recording track on a recordable disk, and the oscillation signal is a recording clock signal used by the recordable disk system to record data onto a recordable disk.

* * * * *